(12) United States Patent
Yokomizo

(10) Patent No.: US 10,863,100 B2
(45) Date of Patent: Dec. 8, 2020

(54) CONTROL APPARATUS, COMMUNICATION APPARATUS, CONTROL METHOD, AND STORAGE MEDIUM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 16/205,818

(22) Filed: Nov. 30, 2018

(65) Prior Publication Data

US 2019/0098222 A1 Mar. 28, 2019

Related U.S. Application Data

(63) Continuation of application No. PCT/JP2017/015588, filed on Apr. 18, 2017.

(30) Foreign Application Priority Data

Jun. 10, 2016 (JP) .................... 2016-116458

(51) Int. Cl.
*H04R 5/00* (2006.01)
*H04N 5/232* (2006.01)
(Continued)

(52) U.S. Cl.
CPC ......... *H04N 5/23299* (2018.08); *G03B 17/02* (2013.01); *G03B 31/00* (2013.01);
(Continued)

(58) Field of Classification Search
CPC ........ G06F 17/3074; G06F 3/16; G06F 3/167; H04R 1/1083; H04R 2499/11;
(Continued)

(56) References Cited

U.S. PATENT DOCUMENTS

2009/0315984 A1* 12/2009 Lin .................. H04N 7/15
348/61

FOREIGN PATENT DOCUMENTS

| CN | 101610360 A | 12/2009 |
|---|---|---|
| CN | 101771814 A | 7/2010 |

(Continued)

OTHER PUBLICATIONS

International Search Report issued in corresponding Parent International Application No. PCT/JP2017/015588 dated Jun. 27, 2017.

(Continued)

*Primary Examiner* — Leshui Zhang
(74) *Attorney, Agent, or Firm* — Venable LLP

(57) ABSTRACT

A control apparatus includes a determination unit configured to perform detection processing for detecting a volume of a sound obtained by sound obtaining unit corresponding to imaging unit, determine whether the volume is not less than a threshold, and execute volume determination processing for outputting a determination result, a change control unit configured to perform first change control for changing an imaging direction in the imaging unit, and a control unit configured to control to change control associated with the volume determination processing when the first change control is executed by the change control unit and the second change control is executed by the change control unit, so as not to set a state in which the first change control is performed, upon execution of the second change control.

7 Claims, 9 Drawing Sheets

(51) Int. Cl.
*G03B 31/00* (2006.01)
*G03B 17/02* (2006.01)
*G06F 3/16* (2006.01)
*H04R 29/00* (2006.01)

(52) U.S. Cl.
CPC ............ *G06F 3/165* (2013.01); *H04N 5/232* (2013.01); *H04N 5/23206* (2013.01); *H04R 29/001* (2013.01)

(58) Field of Classification Search
CPC ...... H04R 2499/13; H04R 3/04; H03G 5/165; H03G 3/00; H03G 3/32; H03G 5/005; H03G 5/16; H03G 9/025; G10K 15/02; G10K 15/04; G10K 2210/108; G10K 2210/128; G10K 2210/12821; G10K 2210/3014; G10L 21/0208; G10L 15/20; G10L 19/0204; G10L 21/0232; G10L 21/057; G10L 15/00; G10L 15/22; G10L 25/51; G10L 2015/088; H04B 15/00; H04B 1/109; H04B 3/21; H04N 5/772; H04N 2071/0625; H04N 5/225; H04N 5/232; H04N 7/15; H04N 7/18; G06T 1/00; G08B 21/00; G08B 25/00; G05B 19/04; G01S 5/18; G05D 3/12
USPC .......... 381/306, 23.1, 302, 61, 66, 316, 320, 381/71.3–71.7, 71.11–71.14, 73.1, 74, 79, 381/86, 94.2, 94.3, 94.7, 97, 98, 100, 381/101, 102, 103, 110, 119, 17, 26, 56, 381/57, 124, 92; 700/94; 704/E19.013, 704/E19.014, E19.015, E21.011; 455/63.1, 67.13, 569.2, 570, 114.2, 135, 455/222, 223, 278.1, 283, 296
See application file for complete search history.

(56) References Cited

FOREIGN PATENT DOCUMENTS

| | | | |
|---|---|---|---|
| CN | 103901782 | A | 7/2014 |
| JP | H09-083856 | A | 3/1997 |
| JP | 2004336460 | A | 11/2004 |
| JP | 2005277845 | A | 10/2005 |
| JP | 2008124654 | A * | 5/2008 |
| JP | 2008124654 | A | 5/2008 |
| JP | 2008219227 | A | 9/2008 |
| JP | 2009-284473 | A | 12/2009 |
| TW | 200518041 | A | 6/2005 |

OTHER PUBLICATIONS

Chinese Office Action dated May 6, 2020 in counterpart Chinese Patent Application No. 201780036028.2.

* cited by examiner

CONTROL APPARATUS, COMMUNICATION APPARATUS, CONTROL METHOD, AND STORAGE MEDIUM

CROSS-REFERENCE TO RELATED APPLICATIONS

This application is a Continuation of International Patent Application No. PCT/JP2017/015588, filed Apr. 18, 2017, which claims the benefit of Japanese Patent Application No. 2016-116458, filed Jun. 10, 2016, both of which are hereby incorporated by reference herein in their entirety.

BACKGROUND OF THE INVENTION

Field of the Invention

The present invention relates to a control apparatus, a communication apparatus, a control method, and a storage medium.

Background Art

Monitoring cameras used in conventional monitoring systems include a fixed type in which an overall imaging enable field of view is fixedly imaged and a pan/tilt/zoom (PTZ) type in which imaging is performed while switching a plurality of important monitoring objects in the imaging enable field of view or making the rounds of them.

In the PTZ type, a desirable imaging angle of view of an important object is registered in advance, and the registration of the imaging angle of view is called presetting. A specific position (preset position) in the imaging enable field of view is registered in advance, and the movement of an object to the registered preset position in accordance with a user operation is called preset movement. For example, PTL 1 discloses an arrangement in which at the time of preset movement, pan/tilt is controlled to a preset position, and zoom and focusing are separately controlled by the user.

In an imaging apparatus used for monitoring or the like, it is important to grasp the audio situation of an installation environment in addition to recording of the imaged video. PTL 2 discloses a method of controlling an imaging direction and an imaging operation by obtaining information from a dedicated device (individual information generator) for generating position information or audio information. There is also available an imaging apparatus having a volume detection function of performing detection when the volume exceeds a predetermined threshold. Depending on the types of imaging apparatuses, a built-in microphone is incorporated in an imaging apparatus to grasp the audio situation in order to downsize the apparatus. If the built-in microphone is incorporated, a function of disabling the volume detection during the pan/tilt operation is known in order to prevent an operation error of the volume detection by the pan/tilt operation sound.

CITATION LIST

Patent Literature

PTL 1: Japanese Patent Laid-Open No. 2008-124654
PTL 2: Japanese Patent Laid-Open No. 2005-277845

However, the following problem is posed when the function of disabling the volume detection during the pan/tilt operation is executed. As a premise, assume that the preset movement function of moving the imaging apparatus to the specific position at the time of volume detection is set. If a sound is kept generated around the imaging apparatus, the imaging apparatus undergoes preset movement as a result of volume detection. Although the volume detection is kept disabled during pan/tilt movement, the volume detection is enabled upon completion of the preset movement. When the volume detection is enabled after the preset movement and the sound is then detected again, the preset movement is executed again. For this reason, during operation of the sound, the preset movement is kept performed, undesirably disabling camera control.

The present invention has been made in consideration of the above problem and provides a control technique capable of preventing an operation error caused by volume detection and performing stable imaging control.

SUMMARY OF THE INVENTION

A control apparatus according to an aspect of the present invention has the following arrangement. That is, a control apparatus is comprising: a determination unit configured to perform detection processing for detecting a volume of a sound obtained by sound obtaining unit corresponding to imaging unit, determine whether the volume is not less than a threshold, and execute volume determination processing for outputting a determination result; a change control unit configured to perform first change control for changing an imaging direction in the imaging unit when the determination result indicates the volume of not less than the threshold and second change control for changing an imaging direction in the imaging unit regardless of the volume; and a control unit configured to control to change control associated with the volume determination processing when the first change control is executed by the change control unit and the second change control is executed by the change control unit, so as not to set a state in which the first change control is performed, upon execution of the second change control.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

An embodiment of the present invention will be described in detail with reference to the accompanying drawings. Note that the constituent elements described in this embodiment are merely examples. The technical scope of the present invention is determined by the scope of the appended claims and is not limited by the individual embodiments to be described below.

Figure 1:
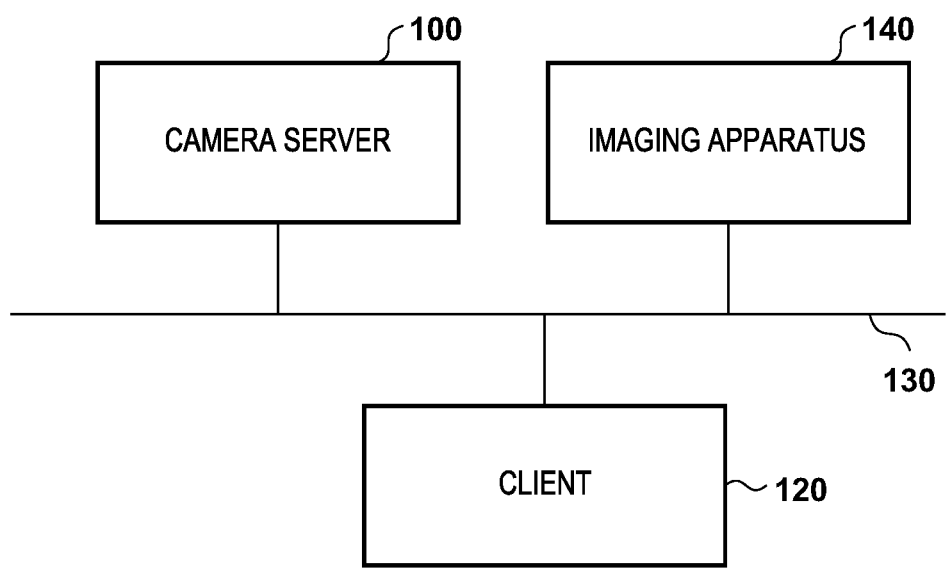
FIG. 1 is a block diagram showing a system arrangement according to this embodiment.

FIG. 1 is a block diagram showing the arrangement of an imaging system (monitoring system) according to an embodiment. The imaging system (monitoring system) includes a camera server 100, a client 120, and an imaging apparatus 140. The camera server 100, the client 120, and the imaging apparatus 140 are connected to one another via a network 130. The camera server 100 can deliver, via the network 130, an image obtained from the imaging apparatus 140. The client 120 can access the camera server 100, and control image quality parameters such as pan/tilt/zoom, focus, and exposure while obtaining an image, to thereby perform preset setting. Note that as the arrangement of the imaging system (monitoring system) shown in FIG. 1, one camera server is used for descriptive simplicity, but two or more camera servers can be used. In addition, another client which accesses the camera server 100 to receive and accumulate images other than the client 120 may be used.

The network 130 can be formed from a plurality of routers, switches, and cables for satisfying the communication standard such as Ethernet®. In this embodiment, the communication standard, scale, and arrangement of the network 130 are not limited to a specific one as far as the communication between the camera server 100 and the client 120 can be performed without any trouble. For example, the network 130 includes the Internet, a LAN (Local Area Network), or a WAN (Wide Area Network).

Figure 3:
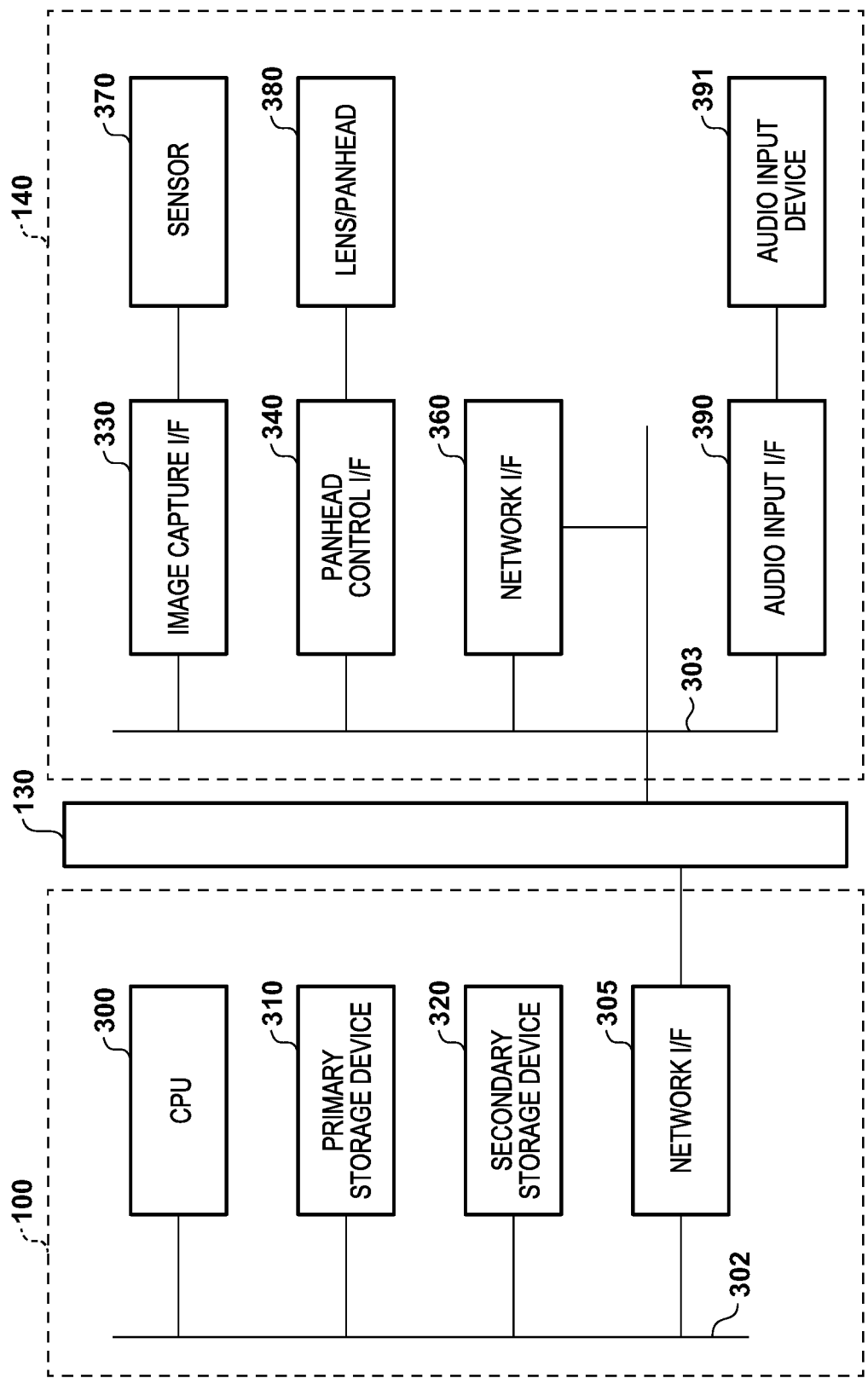
FIG. 3 is a block diagram showing the hardware arrangement of a camera server and an imaging apparatus according to this embodiment.

FIG. 3 is a block diagram showing the hardware arrangement of the camera server 100 and the imaging apparatus 140. The camera server 100 includes a CPU (Central Processing Unit) 300, a primary storage device 310, a secondary storage device 320, and a network I/F (Interface) 305. The CPU 300, the primary storage device 310, the secondary storage device 320, and the network I/F 305 are connected to an internal bus 302 and can perform data communication with each other. The primary storage device 310 is a rewriteable high-speed storage device represented by, for example, a RAM (Random Access Memory) to which an OS (Operating System), various kinds of processing programs, and various kinds of data are loaded. The primary storage device 310 can also be used as a work area for the OS and various kinds of programs.

The secondary storage device 320 is a nonvolatile storage device represented by a flexible disk device (FDD), a hard disk device (HDD), a flash memory, or a CD-ROM drive. The secondary storage device 320 is used as a permanent storage area of the OS, various kinds of programs, and various kinds of data. In addition, the secondary storage device 320 can also be used as a storage area of various types of short-term data. The network I/F 305 functions as a communication unit to be connected to the network 130 and implements communication with the imaging apparatus 140, the client 120, and the like via a communication medium such as Ethernet®.

In the imaging apparatus 140, an image capture I/F 330, a panhead control I/F 340, a network I/F 360, and an audio input I/F 390 are connected to each other via an internal bus 303.

An image sensor 370 formed from, for example, a CCD or CMOS sensor functioning as an imaging unit is connected to the image capture I/F 330. Image data obtained from the image sensor 370 via the image capture I/F 330 is processed in accordance with image quality parameters, converted and compressed into a predetermined format, transferred to the camera server 100 via the network 130, and stored in the primary storage device 310.

A lens/panhead 380 is connected to the panhead control I/F 340 that controls the changes of the imaging position and the imaging angle of view. The pan/tilt/zoom mechanism is controlled to change the imaging position and the imaging angle of view. The network I/F 360 functions as a communication unit which connects to the network 130 and implements communication with the camera server 100, the client 120, and the like via a communication medium such as Ethernet®.

Audio data collected from an audio input device 391 (sound collection unit) such as a microphone is input to the audio input I/F 390. The audio input I/F 390 converts the input audio data into digital data. The converted audio data is transferred to the camera server 100 via the network 130 and stored in the primary storage device 310.

Next, the functional arrangement of a control apparatus 200 according to this embodiment will be described below. In the following description, a case in which the control apparatus 200 is arranged in the camera server 100 is exemplified. However, the scope of the present invention is not limited to this. The control apparatus 200 may be arranged in any one of, for example, the camera server 100, the client 120, and the imaging apparatus 140.

Figure 2:
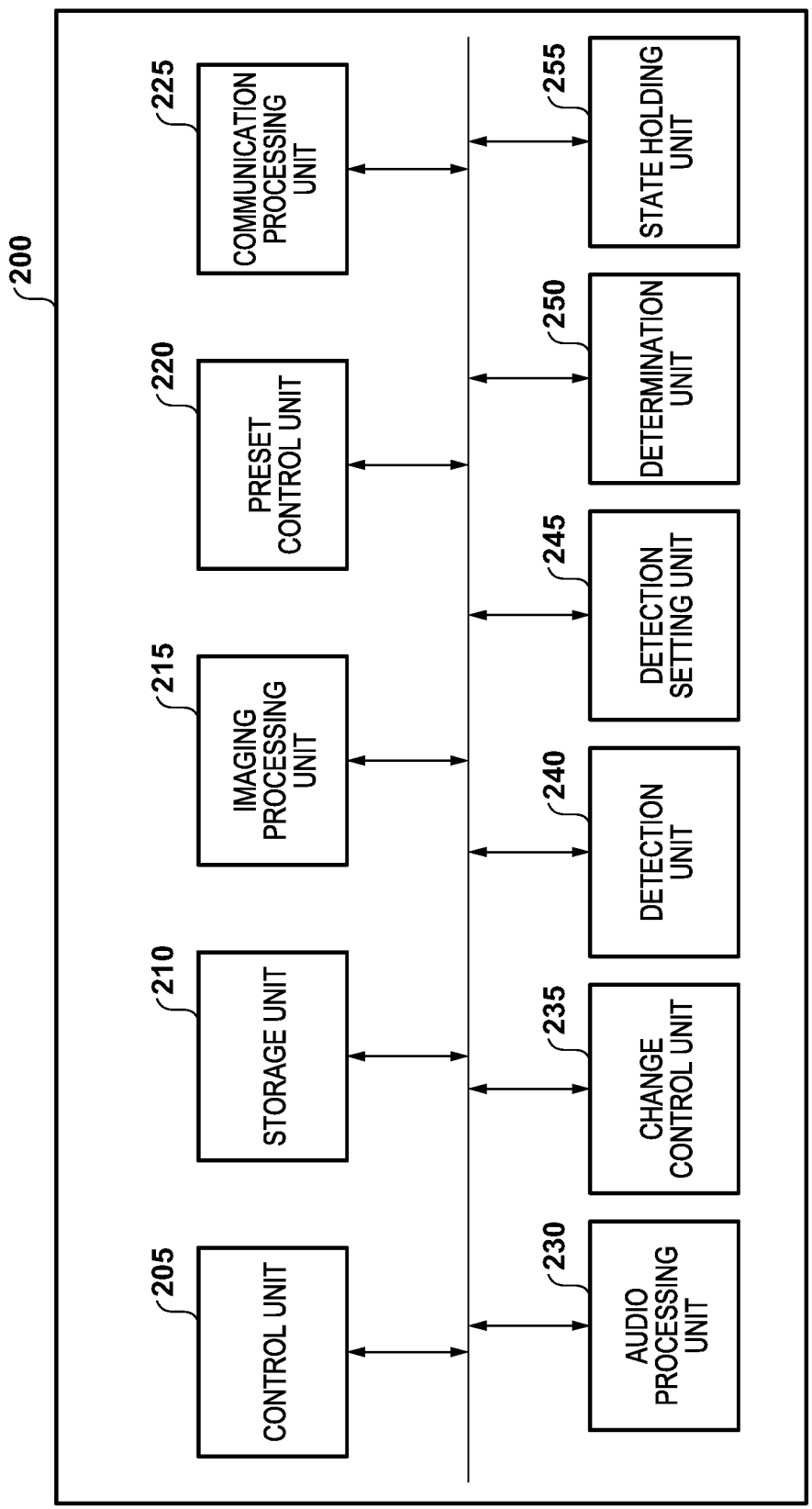
FIG. 2 is a block diagram showing the functional arrangement of a control apparatus according to this embodiment.

FIG. 2 is a view for explaining the functional arrangement of the control apparatus 200. When the OS which is the basic program for controlling the overall apparatus and various kinds of processing programs are loaded into a storage unit 210, each functional arrangement can be implemented by execution of the OS and the various kinds of processing programs by the CPU. An imaging processing unit 215 obtains, via the image capture I/F 330, the image data obtained by the image sensor 370 of the imaging apparatus 140 and performs image processing and encoding processing in accordance with the image quality parameters set from a preset control unit 220. Under the control of a control unit 205, the preset control unit 220 controls, via the panhead control I/F 340, the lens/panhead 380 for changing the imaging position and the imaging angle of view to control the pan/tilt/zoom position in accordance with the preset position and preset round setting from the client 120 or the preset movement setting by an event. The preset control unit 220 sets image quality parameters such as the focus, exposure, white balance, day/night, smart shade correction, noise reduction, sharpness, and color density stored as the preset parameters in the imaging processing unit 215.

In accordance with a request from each of various kinds of clients, a communication processing unit 225 transmits, to each of the various kinds of clients via the network 130, the image data stored in the primary storage device 310. The communication processing unit 225 transfers, to the preset control unit 220, the preset position and preset round setting sent from each of the various kinds of clients, the preset movement setting by the event, the pan/tilt/zoom position, and the image quality parameters. The communication processing unit 225 stores the received preset setting, the received preset round setting, and the like in the secondary storage device 320.

An audio processing unit 230 obtains audio data collected from the audio input device 391 and compares it with the threshold stored in the secondary storage device 320 of the camera server 100. By this comparison between the audio data and the threshold, if the obtained audio data is equal to or more than the threshold, the audio processing unit 230 notifies the preset control unit 220 of the comparison result indicating that the obtained audio data is equal to or more than the threshold. By notifying the preset control unit 220 of the comparison result, the preset control at the time of volume detection can be executed. In addition, the audio processing unit 230 holds a volume detection setting flag and a volume detection state flag in the storage unit 210 or the primary storage device 310 based on the obtained audio data, thereby managing the setting and state of volume detection. The cooperation of the processing units is performed using functions provided by the OS, as needed. A detection unit 240 detects the volume of the sound collected by the audio input device 391 (sound collection unit) such as a microphone. If the volume equal to or more than the threshold is detected by the detection unit 240, the control unit 205 can execute first control for changing the angle of view in the image sensor 370 (imaging unit) so as to obtain an image at a predetermined angle of view and second control for changing the image of the designated angle of view in accordance with an imaging instruction when the imaging instruction for causing the image sensor 370 to obtain the image of the designated angle of view is input.

In a case in which execution of the first control is terminated, if the state of volume detection upon detecting of the volume equal to or more than the threshold is not changed, the control unit 205 can preferentially execute the second control over the first control. For example, if the detection unit 240 detects the volume equal to or more than the predetermined threshold, the control unit 205 preferentially executes the first control over the second control in a state prior to the termination of the execution of the first control. In a case in which the execution of the first control is terminated, if the volume detection state in which the detection unit 240 detects the volume equal to or more than the threshold prior to the completion of the execution of the first control is not changed, the control unit 205 preferentially executes the second control over the first control.

Figure 4:
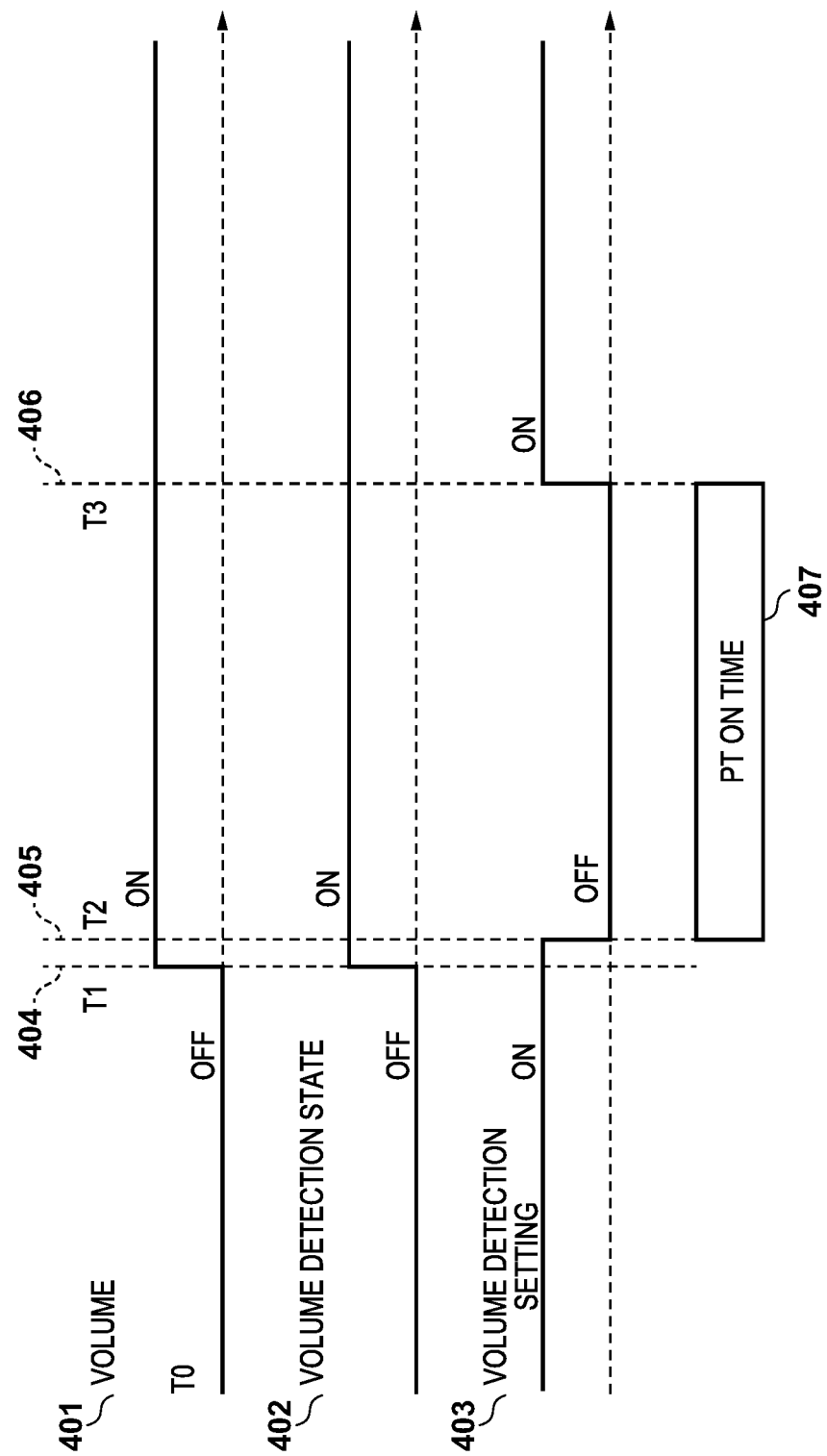
FIG. 4 is a timing chart of a volume and an audio processing unit according to the first embodiment.
Figure 5:
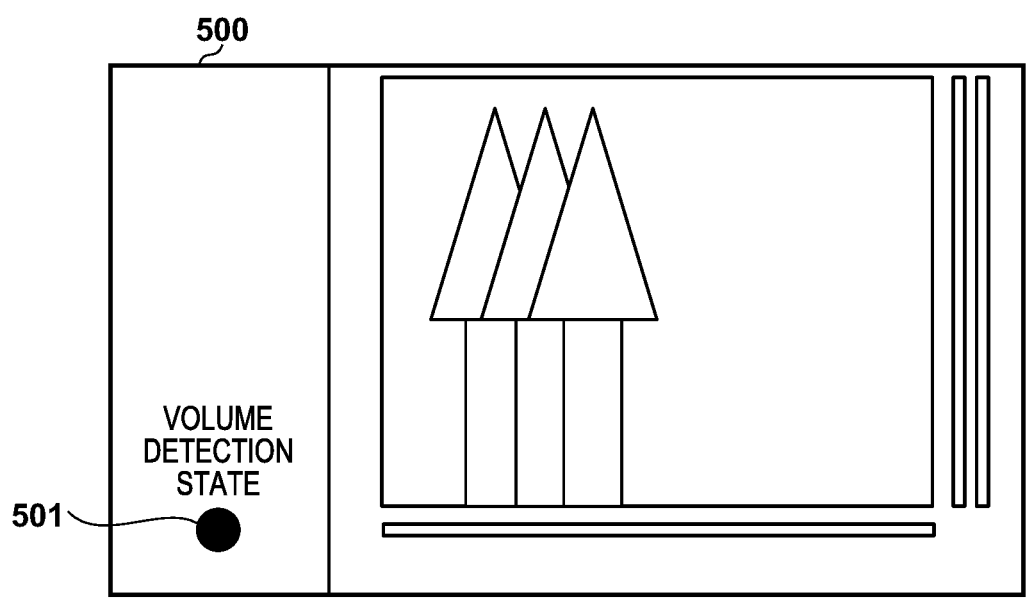
FIG. 5 is a view showing an example of a UI screen of a client according to the first embodiment.
Figure 6:
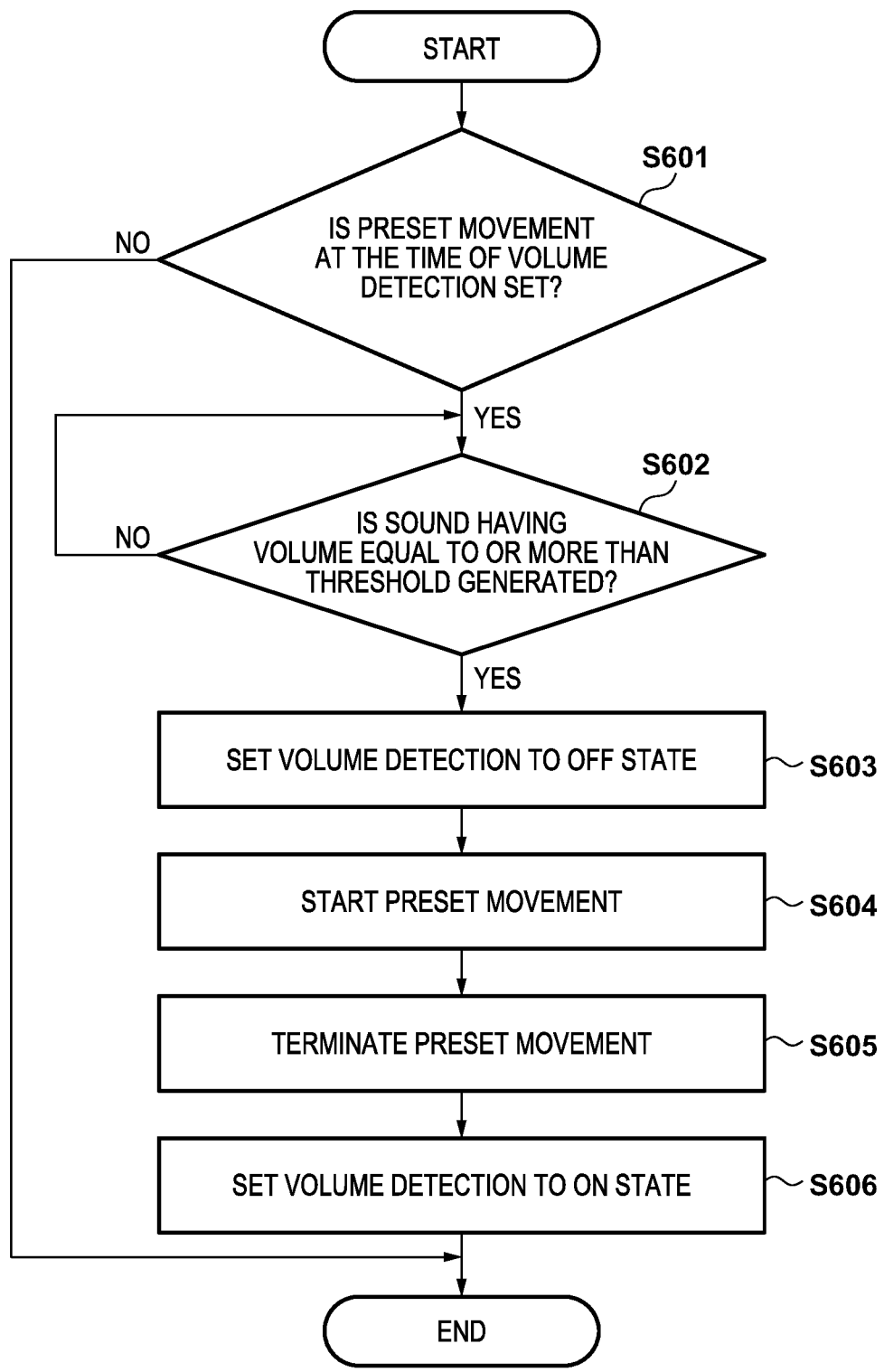
FIG. 6 is a flowchart showing an operation of performing preset movement at the time of volume detection according to the first embodiment.

The sequence of processing for performing the preset movement at the time of volume detection will be described with reference to FIGS. 4 to 6. FIG. 4 is a timing chart of the volume and the audio processing unit 230. FIG. 5 is a view showing an example of a UI screen on the client 120. FIG. 6 is a flowchart showing the sequence of processing for performing the preset movement at the time of volume detection.

First, the timing chart of FIG. 4 will be described below. In the timing chart of FIG. 4, the abscissa represents time, and the ordinate represents the states corresponding to the respective items of a volume 401, a volume detection state 402, and a volume detection setting 403 in the ON/OFF states. In the functional arrangement shown in FIG. 2, a state holding unit 255 holds the volume detection state (ON or OFF state) of the detection unit 240 based on the detection result of the detection unit 240. A detection setting unit 245 performs enable setting which executes the volume detection by the detection unit 240 or disable setting which does not execute the volume detection by the detection unit 240.

The volume 401 represents the volume state in which the volume is generated around the camera server 100. If the magnitude of the volume is less than the volume detection threshold, the state is set as an OFF state. If the magnitude of the volume is equal to or more than the volume detection threshold, the state is set as an ON state. The volume detection state 402 held by the state holding unit 255 represents a volume detection state. ON represents a state during the volume detection, and OFF represents a state in which the volume detection is not detected. The audio processing unit 230 stores a flag representing the volume detection state in the storage unit 210 or the primary storage device 310. The volume detection state can be managed by the flag stored in the storage unit 210 or the primary storage device 310. For example, the communication processing unit 225 can transmit the flag stored in the primary storage device 310 to each of the various kinds of clients via the network 130 in accordance with a request from each of the various kinds of clients. The client 120 can control the display of the UI screen based on, for example, the flag obtained from the camera server 100. For example, as shown in FIG. 6, an identification display element (icon 601) representing whether the operation is during the volume detection is displayed in the UI screen (600) of the client 120. By controlling the display of the display form such as the display color and flickering of the identification display element (icon 601), it is possible to perform identification display to determine whether the operation is during the volume detection.

Referring back to FIG. 4, the volume detection setting 403 set by the detection setting unit 245 represents a volume detection setting state. ON represents that the volume detection is performed (enable setting), and OFF represents that the volume detection is not performed (disable setting). The audio processing unit 230 stores a volume detection setting state flag in the storage unit 210 or the primary storage device 310. The volume detection setting state can be managed by the flag stored in the storage unit 210 or the primary storage device 310.

Referring to FIG. 4, T0 represents initial state time, a timing 404 represents a timing at time T1, a timing 405 represents a timing at time T2, and a timing 406 represents a timing at time T3. Referring to FIG. 4, a period between time T2 and time T3 indicates that the imaging apparatus 140 is a pan/tilt ON time (PT ON time) 407.

Next, the sequence of processing of performing preset movement at the time of volume detection will be described with reference to the flowchart in FIG. 6. First, in step S601, the audio processing unit 230 obtains, from the storage unit 210 or the primary storage device 310, information indicating whether the preset movement at the time of volume detection is set. If the preset movement at the time of volume detection is not set (NO in step S601), this processing sequence is terminated. In FIG. 4, first, assume that the volume detection setting 403 is set ON, and that the preset movement setting at the time of volume detection is enabled. If the preset movement at the time of volume detection is set (YES in step S601), the process advances to step S602.

The audio processing unit 230 determines in step S602 whether a sound having a volume equal to or more than a specific threshold is generated around the camera server 100. If the sound having the volume equal to or more than the specific threshold is not generated (NO in step S602) in step S602, the audio processing unit 230 waits until a sound having the volume equal to or more than the threshold is generated. Referring to FIG. 4, in the initial state, the volume 401 is set in a state in which the volume is less than the threshold (OFF). For this reason, the volume detection state 402 is also set in a state in which volume detection is not performed (OFF).

If the audio processing unit 230 detects the volume equal to or more than the threshold at the timing 404 in FIG. 4, the volume detection state 402 is switched from the OFF state to the ON state. Referring to FIG. 4, an audio equal to or more than the threshold is generated at the timing 404 and is then kept generated.

If the sound having the volume equal to or more than the threshold is generated in step S602 (that is, YES in step S602), the audio processing unit 230 notifies the preset control unit 220 of the comparison result representing that the obtained audio data is equal to or more than the threshold. Under the control of the control unit 205, the preset control unit 220 executes the preset control at the time of volume detection and performs preset movement for moving the imaging apparatus 140 to the predetermined position. The volume detection setting 403 is not changed and is kept ON at the timing 404.

Subsequently, at the timing 405 (time T2) after the timing 404 (time T1), the audio processing unit 230 switches the volume detection setting 403 from the ON state in which volume detection is performed to the OFF state in which volume detection is not performed (step S603). This is performed to prevent the built-in microphone from collecting a pan/tilt operation sound and prevent an operation error of the volume detection. In a conventional arrangement, at the timing 405, when the volume detection setting 403 is switched from the ON state to the OFF state, the volume detection state 402 is also switched from the ON state to the OFF state. However, in order to solve the problem that camera control cannot be performed during generation of the sound, in the present embodiment, even if the volume detection setting 403 is switched from the ON state to the OFF state, the audio processing unit 230 controls not to switch the state of the volume detection state 402 at the start of the pan/tilt operation. In the case of FIG. 4, during the pan/tilt ON time (PT ON time 407), the identification display element (icon 601) of the UI screen (600) of the client 120 is kept in a display state in which the volume detection state is the ON state.

Under the control of the preset control unit 220, in step S604, at the timing 405 (time T2), the pan/tilt operation (PT operation) is started, and the preset control unit 220 performs the preset movement for moving the imaging apparatus 140 to the predetermined position.

When the pan/tilt operation is terminated at the timing 406 (time T3) in FIG. 4 (step S605), the audio processing unit 230 returns the setting of the volume detection setting 403 to the ON state in step S606. The audio processing unit 230 returns the state from the state (OFF) in which volume detection is not executed even upon reception of the volume information to the state (ON) in which volume detection is executed, and processing in FIG. 6 is terminated. In the conventional arrangement, the volume detection state 402 is switched from the OFF state to the ON state at the timing at which the volume detection setting 403 is switched from the OFF state to the ON state. For this reason, the audio processing unit 230 notifies again the preset control unit 220 of the preset movement, and the preset operation has already been started. After that, since the operations in steps S602 to S606 are repeated, the preset movement is kept performed while the sound is kept generated. Manual camera control cannot be performed. However, according to this embodiment, the volume detection state 402 is kept unchanged even at the timing 406 at which the volume detection setting 403 is switched from the OFF state to the ON state. The audio processing unit 230 does not notify the preset control unit 220 of the preset movement. For this reason, even if the audio is kept generated around the camera server 100, the preset movement is not sequentially executed even after the preset movement for the first time.

Even if the volume equal to or more than the predetermined threshold is kept detected after the preset movement at the time of volume detection is complete, manual camera control can be performed by setting the volume detection state 402 to the ON state. According to the arrangement of this embodiment, the operation error caused by volume detection can be prevented, and the stable imaging control can be performed.

Second Embodiment

Figure 7:
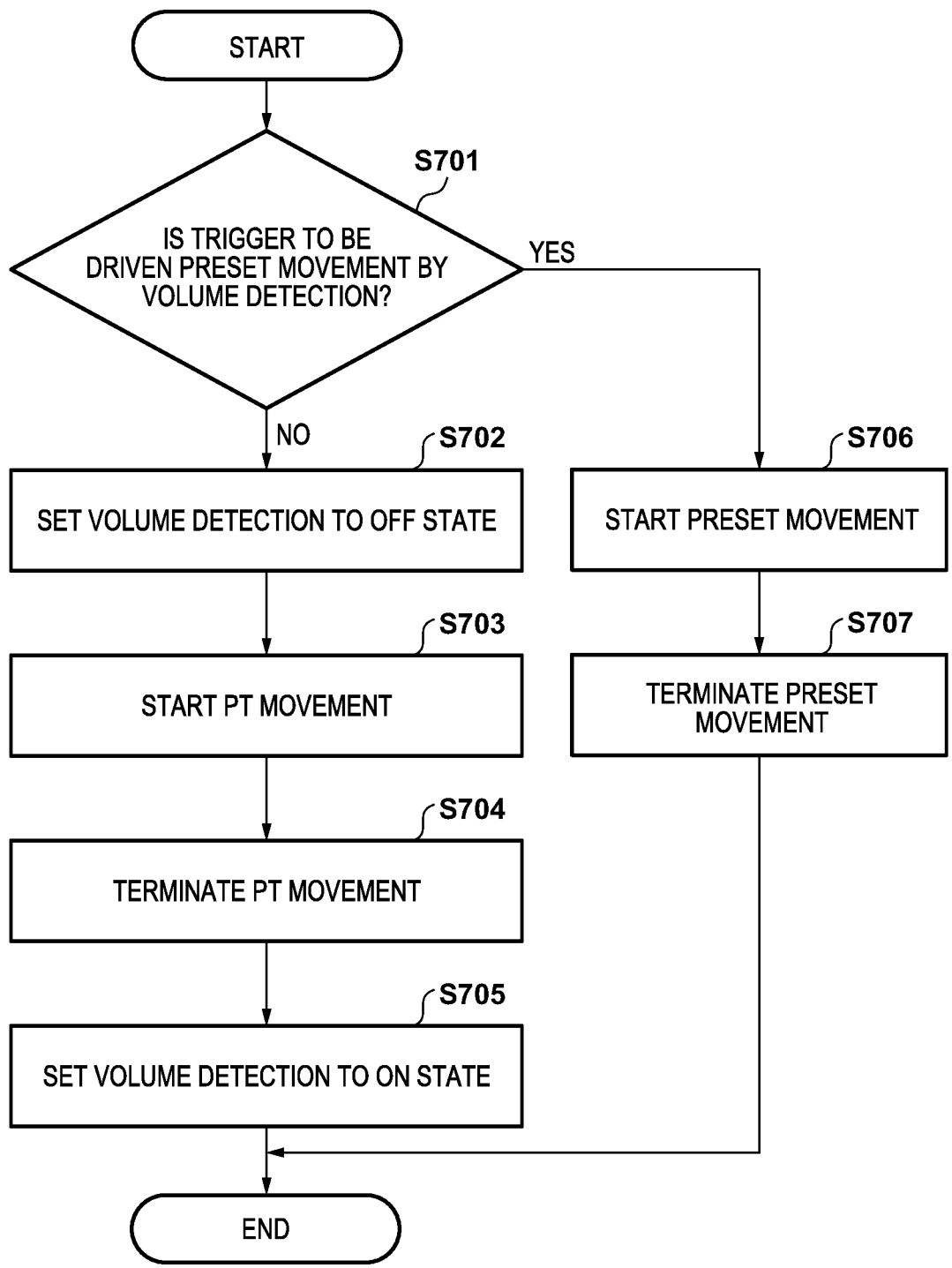
FIG. 7 is a flowchart at the time of a pan/tilt operation according to the second embodiment.
Figure 8:
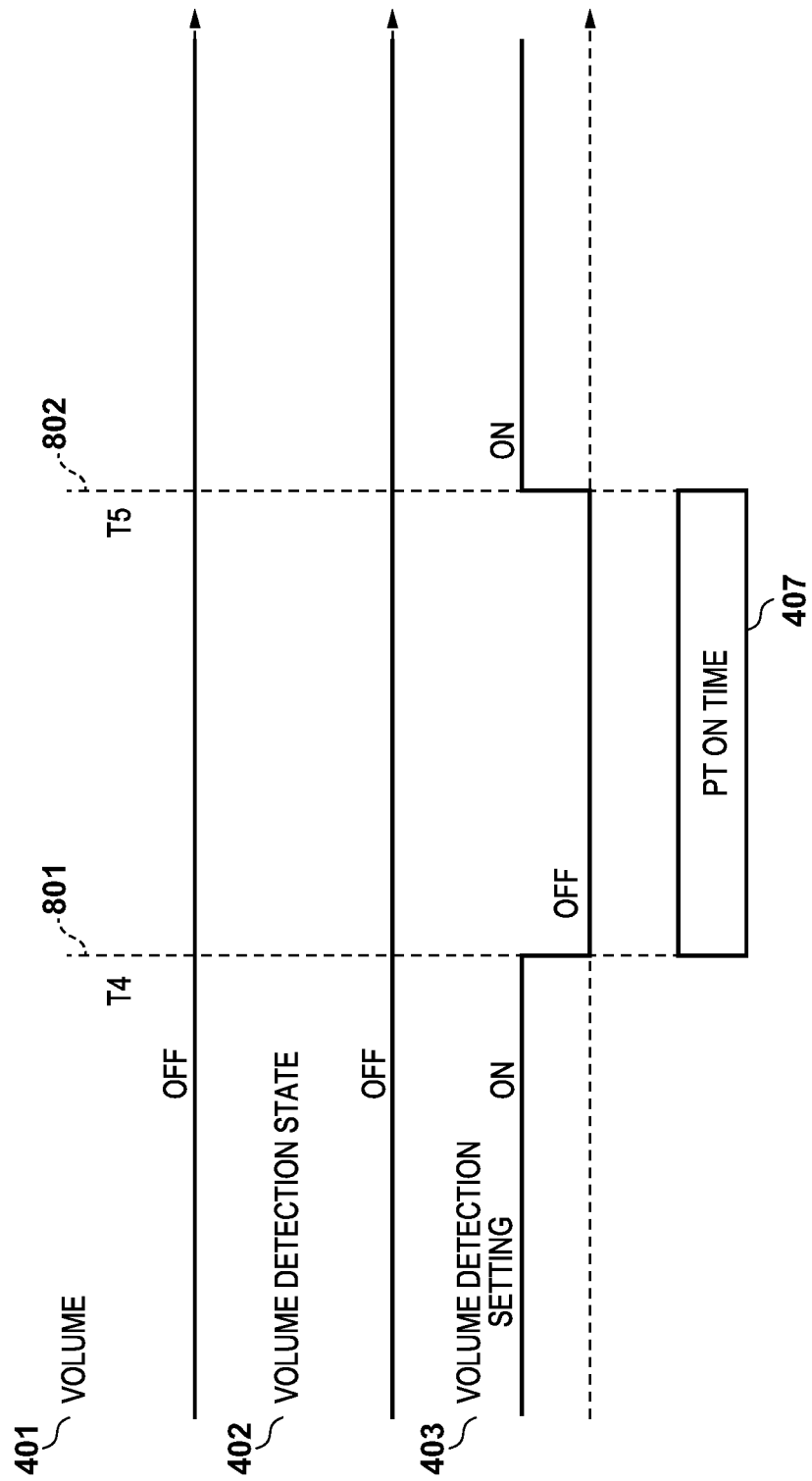
FIG. 8 is a timing chart of a volume and an audio processing unit when a pan/tilt operation trigger according to the second embodiment is an operation other than the volume detection.
Figure 9:
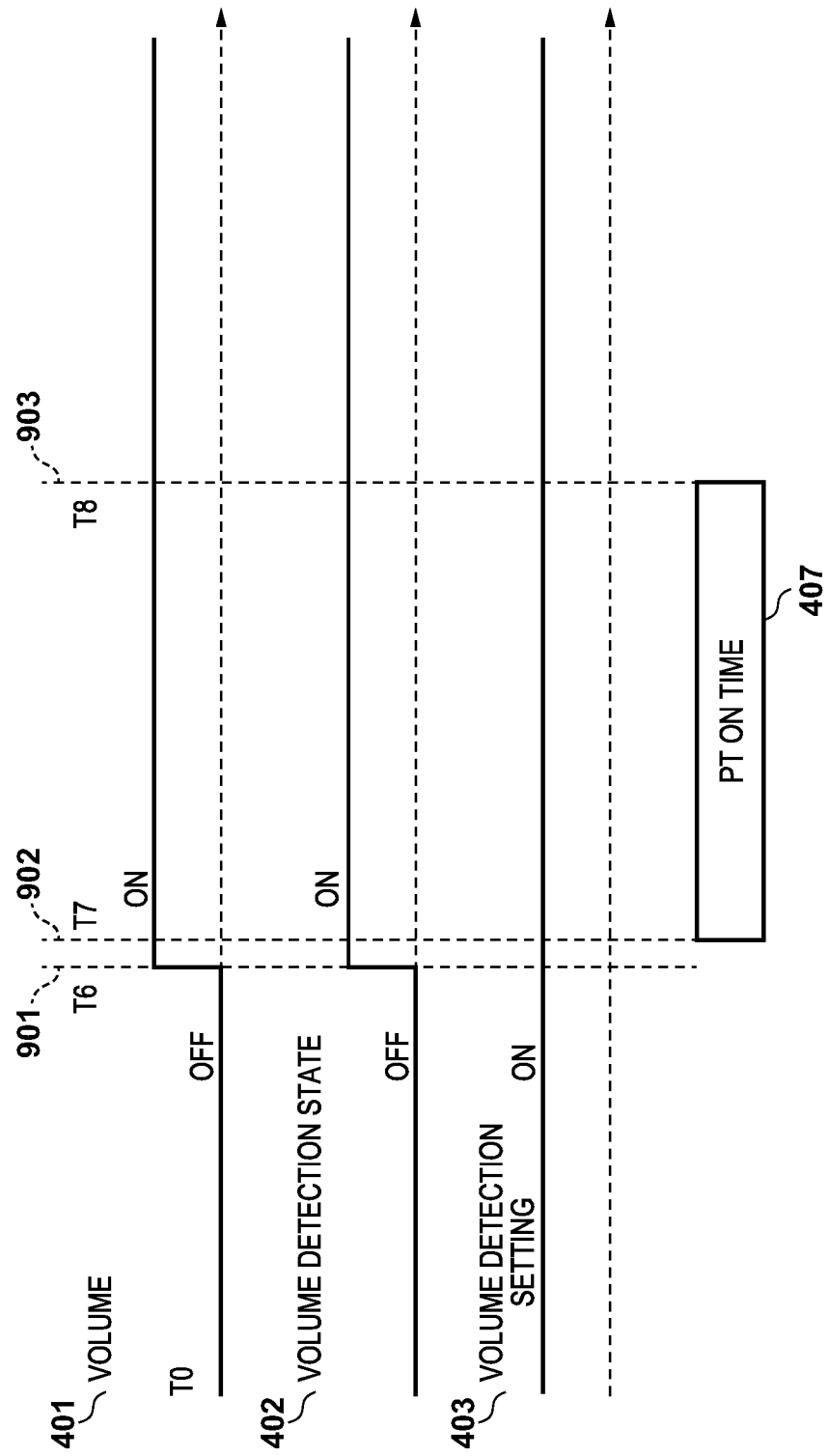
FIG. 9 is a timing chart of the volume and the audio processing unit when the pan/tilt operation trigger according to the second embodiment is the volume detection.

Processing of the second embodiment of the present invention will now be described with reference to FIGS. 7 to 9. FIG. 7 is a flowchart for explaining the sequence of processing at the time of pan/tilt operation. FIGS. 8 and 9 are timing charts of the volume and an audio processing unit 230 according to the second embodiment.

The audio processing unit 230 determines in step S701 whether the trigger of the pan/tilt operation is generated by the preset movement at the time of the volume detection. In the functional arrangement shown in FIG. 2, a determination unit 250 determines based on the volume detection result by a detection unit 240 and the setting by a detection setting unit 245 whether an imaging unit is moved to the preset position to change the angle of view by the first control.

FIG. 8 is a timing chart of the volume and the audio processing unit when the trigger of the pan/tilt operation is generated by an event other than the volume detection. In the timing chart in FIG. 8, as in the timing chart of FIG. 4, the abscissa represents time, and the ordinate represents the states corresponding to a volume 401, a volume detection state 402, and a volume detection setting 403 in ON/OFF states. Referring to FIG. 8, a timing 801 is a timing at time T4, and a timing 802 is a timing at time T5.

There are the following three conditions for the pan/tilt operation, which are set by an operation except for the preset movement by the volume detection. The first condition is a case in which the volume detection setting 403 is set in a state (ON) in which volume detection is executed and the volume 401 around the camera server 100 is less than the threshold (OFF). The second condition is a case in which the volume detection setting 403 is set, from the beginning, in a state (OFF) in which volume detection is not performed even if the volume information is received. The third conditions is a case in which the above two conditions are satisfied (a case in which the volume detection setting 403 is set OFF from the beginning, and the volume 401 around the camera server 100 is less than the threshold (OFF)). In the timing chart shown in FIG. 8, as an example corresponding to the first condition, a case is exemplified in which the volume 401 is less than the threshold (OFF) although the volume detection setting 403 is set in the ON state in which the volume detection is executed.

If an event which triggers the pan/tilt operation is not the preset movement at the time of volume detection (NO in step S701), the process advances to step S702. If the angle of view is changed by the first control without detecting the volume, the detection setting unit 245 of a control apparatus 200 performs disable setting (OFF) by which the volume detection is not executed. In addition, if the change in angle of view by the first control is terminated, the detection setting unit 245 performs enable setting (ON) by which the volume detection is executed. If the volume detection setting by the detection setting unit 245 is changed from the disable setting (OFF) to the enable setting (ON), a state holding unit 255 holds the volume detection state (the OFF state is held in FIG. 8). Detailed processing from step S702 will be described below. In step S702, at the timing 801 (time T4), the audio processing unit 230 switches, before starting the pan/tilt operation, the volume detection setting 403 from a state (ON) in which the volume detection is executed to a state (OFF) in which the volume detection is not executed even upon reception of the volume information. An example of an event as a trigger in step S702 is control for an angle of view from a client 120.

Subsequently, in step S703, a change control unit 235 controls the operation of a lens/panhead 380 via a panhead control OF 340 under the control of a control unit 205. By this control, the pan/tilt operation (PT operation) is started. Even if the built-in microphone collects the pan/tilt operation sound during the pan/tilt operation, an operation error by the volume detection does not occur because the volume detection setting 403 is set OFF.

In step S704, the pan/tilt movement is terminated at the timing 802 (time T5) after the timing 801 (time T4). In step S705, the audio processing unit 230 returns the volume detection setting 403 from the state (OFF) in which the volume detection is not executed even upon reception of the volume information to the state (ON) in which the volume detection is executed, and the processing is terminated. At this time, since the volume 401 is set in the state (OFF) in which the volume 401 is less than the threshold, the audio processing unit 230 will not perform the volume detection. Therefore, the preset movement will not be sequentially executed. The timing chart shown in FIG. 8 has exemplified the state (OFF) in which the volume 401 is less than the threshold. If the volume detection setting 403 is set in the OFF state, the preset movement will not be executed before, the audio processing unit 230 does not always detect the volume.

On the other hand, in the determination in step S701, if the trigger of the pan/tilt operation is the preset movement at the time of volume detection (YES in step S701), the process advances to step S706. If the control for the angle of view is performed by the first control upon detection of the volume, the detection setting unit 245 performs the enable setting (ON) in which the volume detection is executed, from the start of the change in the angle of view by the first control until the termination of the change of the angle of view by the first control. Even if the volume equal to or more than the predetermined threshold is kept detected by the detection unit 240, the state holding unit 255 holds the state of the volume detection (the ON state is held in FIG. 9). The detailed processing will be described below.

FIG. 9 is a timing chart of the volume and the audio processing unit when the pan/tilt operation is triggered by the volume detection. In the timing chart of FIG. 9, as in the timing chart of FIG. 4, the abscissa represents time, and the ordinate represents the states corresponding to the items of volume 401, the volume detection state 402, and the volume detection setting 403 in the ON/OFF states. Referring to FIG. 9, a timing 901 is a timing at time T6, a timing 902 is a timing at time T7, and a timing 903 is a timing at time T8.

In the timing chart of FIG. 9, assume that a volume equal to or more than the threshold is generated at the timing 901 (time T6) and is then kept generated. In addition, at the timing 901 (time T6), since the volume equal to or more than the threshold is detected by the audio processing unit 230, the volume detection state 402 is switched from the state (OFF) in which the volume detection is not performed to the state (ON) in which the volume detection is being performed. Since the state of the volume detection state 402 is switched from the OFF state to the ON state, the audio processing unit 230 notifies a preset control unit 220 of the preset movement. At the timing 902 (time T7) after the timing 901 (time T6), the audio processing unit 230 notifies the preset control unit 220 of the comparison result representing that the obtained audio data is equal to or more than the threshold. Under the control of the control unit 205, the preset control unit 220 executes the preset control at the time of volume detection, thereby performing preset movement for moving an imaging apparatus 140 to the predetermined position. In step S706, the imaging apparatus 140 starts preset movement to the predetermined position. In the first embodiment, at the timing 405 (time T2), the audio processing unit 230 switches the volume detection setting 403 to the OFF state at the time of starting the pan/tilt operation. However, according to this embodiment, the setting of the volume detection setting 403 is not set to the OFF state. In addition, the volume detection state 402 is kept in the ON state.

Even if the pan/tilt operation is terminated at the timing 903 (time T8) (step S707), the state of the volume detection state 402 is kept unchanged in the ON state because the volume detection setting 403 is kept unchanged in the ON state. Since the state of the volume detection state 402 is kept unchanged, the audio processing unit 230 does not notify the preset control unit 220 of the preset movement. For this reason, even if a situation is set in which the audio is kept generated around a camera server 100, the preset movement is not sequentially performed after the preset movement for the first time.

As described above, manual camera control can be preferentially performed by switching the setting of the volume detection setting 403 in accordance with an event serving as the trigger of the pan/tilt operation even if the volume equal to or more than the predetermined threshold is kept detected after the execution of the preset movement at the time of the volume detection.

According to the present invention, operation error caused by volume detection can be prevented, and stable imaging control can be performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus comprising:
a processor, and
a memory coupled to the processor storing instructions that, when executed by the processor, cause the processor to perform operations comprising:
performing detection processing for detecting a volume of an obtained sound corresponding to an imaging apparatus, if a volume detection setting flag, which indicates whether the volume detection is enabled, is at an ON state;
determining whether the volume is not less than a threshold;
switching a volume detection state flag, which indicates whether the volume of the obtained sound is detected, from an OFF state to an ON state according to a detection result if the volume is not less than the threshold;
executing volume determination processing for outputting the determination result;
executing a change control for changing an imaging direction of the imaging apparatus after the volume detection state flag is switched from the OFF state to the ON state;
switching the volume detection setting flag from the ON state to the OFF state when the change control starts; and
controlling to maintain the volume detection state flag at an ON state when the volume detection setting flag is switched from the ON state to the OFF state.

2. The control apparatus according to claim 1, wherein the change control is preferentially performed based on an imaging instruction when the imaging instruction for causing the imaging apparatus to obtain images of a designated angle of view is inputted if the detection state flag, which indicates that the volume is not less than the threshold, prior to completion of the execution of the change control, not changed.

3. The control apparatus according to claim 1, wherein the change control associated with the volume determination is preferentially performed over the change control based on an imaging instruction when the imaging instruction for causing the imaging apparatus to obtain images of a designated angle of view is inputted before the execution of the change control associated with the volume determination is terminated.

4. The control apparatus according to claim 1, wherein the operations further comprise: maintaining the volume detection state flag at the ON state when the volume detection setting flag is switched from the OFF state to the ON state after the change control is terminated.

5. A communication apparatus comprising a control apparatus, the control apparatus comprising:
a processor, and
a memory coupled to the processor storing instructions that, when executed by the processor, cause the processor to perform operations comprising:
performing detection processing for detecting a volume of an obtained sound corresponding to an imaging apparatus if a volume detection setting flag, which indicates whether the volume detection is enabled, is at an ON state;
determining whether the volume is not less than a threshold;
switching a volume detection state flag, which indicates whether the volume of the obtained sound is detected, from an OFF state to an ON state according to a detection result if the volume is not less than the threshold;
executing volume determination processing for outputting the determination result;
executing a change control for changing an imaging direction of the imaging apparatus after the volume detection state flag is switched from the OFF state to the ON state
switching the volume detection setting flag from the ON state to the OFF state when the change control starts; and
controlling to maintain the volume detection state flag at an ON state when the volume detection setting flag is switched from the ON state to the OFF state.

6. A control method of a control apparatus, comprising:
performing detection processing for detecting a volume of an obtained sound corresponding to an imaging apparatus if a volume detection setting flag, which indicates whether the volume detection is enabled, is at an ON state;
determining whether the volume is not less than a threshold;
switching a volume detection state flag, which indicates whether the volume of the obtained sound is detected, from an OFF state to an ON state according to a detection result if the volume is not less than the threshold;
executing volume determination processing for outputting the determination result;
executing a change control for changing an imaging direction of the imaging apparatus after the volume detection state flag is switched from the OFF state to the ON state;
switching the volume detection setting flag from the ON state to the OFF state when the change control starts; and
controlling to maintain the volume detection state flag at an ON state when the volume detection setting flag is switched from the ON state to the OFF state.

7. A non-transitory computer-readable storage medium storing a program for causing a computer to perform functions of:
performing detection processing for detecting a volume of an obtained sound corresponding to an imaging apparatus if a volume detection setting flag, which indicates whether the volume detection is enabled, is at an ON state;

determining whether the volume is not less than a threshold;

switching a volume detection state flag, which indicates whether the volume of the obtained sound is detected, from an OFF state to an ON state according to a detection result if the volume is not less than the threshold;

executing volume determination processing for outputting the determination result;

executing a change control for changing an imaging direction of the imaging apparatus after the volume detection state flag is switched from the OFF state to the ON state;

switching the volume detection setting flag from the ON state to the OFF state when the change control starts; and controlling to maintain the volume detection state flag at an ON state when the volume detection setting flag is switched from the ON state to the OFF state.

* * * * *